L. R. WHITESIDE.
CRANK HEAD FOR MOWING MACHINES.
APPLICATION FILED JUNE 3, 1911.
1,035,667.
Patented Aug. 13, 1912.
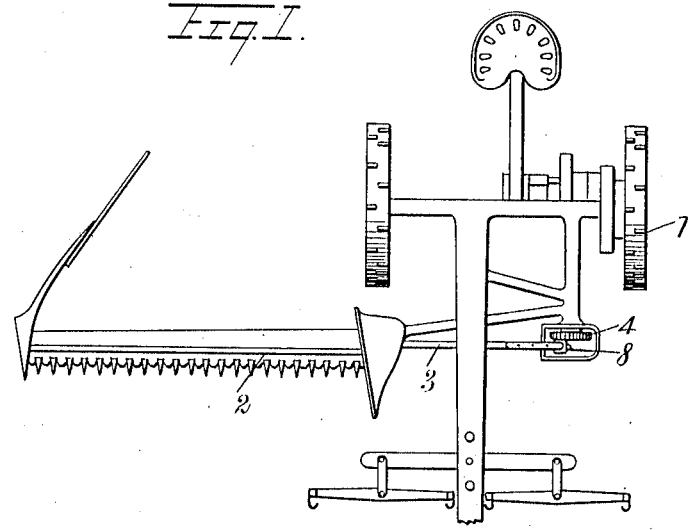
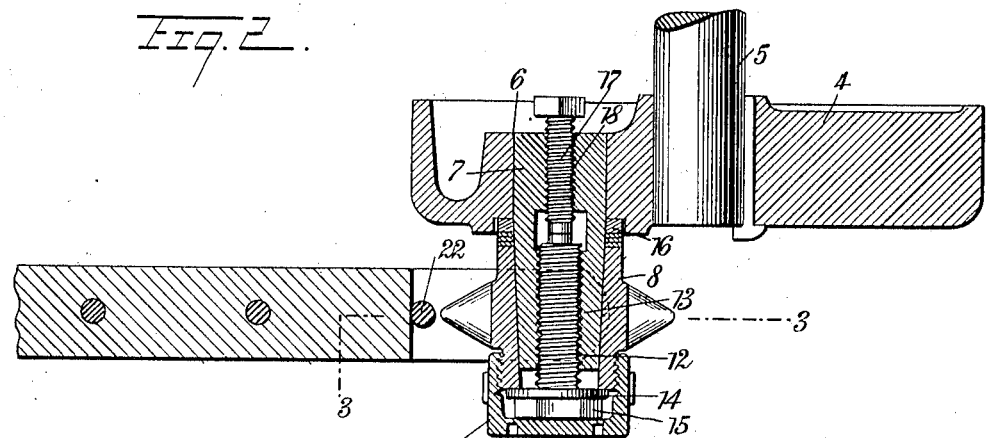
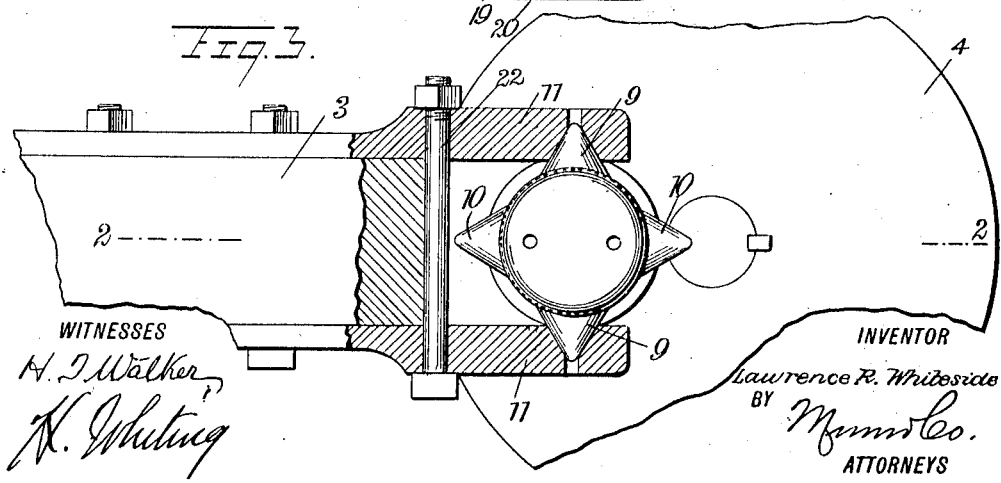
WITNESSES
H. J. Walker
K. Whiting
INVENTOR
Lawrence R. Whiteside
BY
Munn & Co.
ATTORNEYS

UNITED STATES PATENT OFFICE.

LAWRENCE R. WHITESIDE, OF BELLEVILLE, ILLINOIS.

CRANK-HEAD FOR MOWING-MACHINES.

1,035,667.  Specification of Letters Patent.  Patented Aug. 13, 1912.

Application filed June 3, 1911. Serial No. 631,081.

*To all whom it may concern:*

Be it known that I, LAWRENCE R. WHITE-SIDE, a citizen of the United States, and a resident of Belleville, in the county of St. Clair and State of Illinois, have invented a new and Improved Crank-Head for Mowing-Machines, of which the following is a full, clear, and exact description.

This invention relates to a new and improved crank head for mowing machines or the like.

An object of this invention is to provide a crank head for a mowing machine or other harvesting mechanism, which can be adjusted so as to take up the wear, which will be simple in construction, inexpensive to manufacture, strong, durable, and readily accessible.

A further object of this invention is to provide a crank head with a crank pin sleeve having a plurality of pairs of trunnions interchangeable with the pitman, so as to take up the wear and obviate irregularities in the movement of the mechanism, so as to prevent excessive jarring.

These and further objects, together with the construction and combination of parts will be more fully described hereinafter and particularly set forth in the claims.

Reference is to be had to the accompanying drawings forming a part of this specification, in which similar characters of reference indicate corresponding parts in all the views, and in which—

Figure 1 is a top plan view showing my device in position on a mowing machine; Fig. 2 is an enlarged horizontal section on the line 2—2 of Fig. 3; and Fig. 3 is an enlarged fragmentary view, partly in section on the line 3—3 of Fig. 2.

Referring more particularly to the separate parts of this invention as embodied in the form shown in the drawings, 1 indicates a mowing machine provided with cutting mechanism 2 of any usual character, which is connected by means of a pitman 3 to a crank disk 4 on a power shaft 5, the latter being driven in any suitable manner. The crank disk 4, which is secured to the shaft 5 in any suitable manner, as by being keyed thereto, is provided with an opening at 6, in which is fixedly secured a crank pin 7. The crank pin 7 projects beyond the face of the disk 4, and is conically beveled, as will be seen by reference to Fig. 2.

Rotatably mounted on the projecting portion of the crank pin 7, there is provided a trunnion collar 8, which has a conical socket, so as to fit the conical portion of the crank pin 7. This trunnion collar 8 is provided with a plurality of pairs of trunnions 9 and 10, the members of each pair being arranged diametrically opposite to each other and adapted to engage in sockets on straps 11 secured in spaced relation on the pitman 3, so as to form a somewhat U-shaped opening between them, in which the collar can oscillate. This connection permits a limited angular movement of the cutter bar relative to the crank pin in case it is desired to shift the position of the cutter bar without interfering with the driving connection.

For the purpose of securing the collar 8 on the crank pin 7, there is provided a fastener 12, in the form of a screw-threaded member engaging a screw-threaded socket 13, extending longitudinally of the crank pin 7. This member 12 is provided with a flange or washer 14, whereby it engages the end of the collar 8, and is further provided with an angular head 15, which forms a nut, whereby it can be adjusted and tightened. The movement of the collar 8 toward the disk 4 may be limited by one or a plurality of washers or shims 16, which may be of any suitable material, such as fiber. The inward motion of the fastener 12 is limited by a stop 17, which in this instance is shown in the form of a screw bolt engaging a screw-threaded opening 18 in the opposite end of the crank pin 7 and extending in alinement with the screw-threaded opening in the other end of the crank pin.

For the purpose of entrapping oil to lubricate the surface between the collar 8 and the crank pin 7, there is provided an oil cap 19, which is screw-threaded internally to engage a corresponding screw-thread on the outer end of the collar 8. This cap may be provided with spaced openings 20, so that a spanner wrench or the like may be inserted to remove it.

The utility of the device will be readily understood when taken in connection with the above description. When the crank pin 7 and the interior of the collar 8 become worn, the slack may be taken up by first loosening the stop 17, and after removing one or more of the shims 16, setting up the fastening bolt 12, so as to force the taper of the collar 8 into more intimate contact with the taper of the crank pin 7. If a pair of the trunnions 9 become worn so as to cause lost motion, a bolt 22, which holds the straps 11 together can be taken off and the straps sprung apart so as to permit the other pair of trunnions 10 to be used in their stead. By this arrangement, the wear of the parts can be readily allowed for, and this wear will be even and not eccentric, as is usually the case.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:—

1. The combination with a crank, of a crank pin tapering conically and extending from said crank, a collar having a tapering socket and disposed upon the outer portion of the crank pin, a screw bolt threaded axially within the crank pin from its outer end, and having an outer head bearing against the outer end of the collar, and a screw stop threaded within the crank pin from its opposite end and adapted to oppose and limit the movement of said bolt.

2. The combination with a crank disk, of a crank pin secured to said disk, said crank pin having a tapering conical surface, a collar rotatably mounted on said crank pin, having a tapering conical socket to correspond to surface of said crank pin, one or more shims interposed between said collar and said disk, said collar having trunnions thereon, a pitman engaging said trunnions, a screw bolt engaging said crank pin and said collar and adapted to form an adjuster to vary the position of said collar with respect to said crank pin, and a screw stop adjustably mounted in said crank pin and adapted to limit the movement of said bolt.

3. The combination with a crank disk, of a crank pin fixedly secured to said disk, said crank pin having a conically tapering portion, a collar, having a conically tapering socket engaging said crank pin, a plurality of pairs of conical trunnions secured to said collar, the members of each pair extending diametrically opposite to each other, a pitman adapted to engage one pair of said trunnions at a time, said crank pin having a plurality of screw-threaded openings therein, an adjuster engaging one of said openings and also engaging said collar so as to vary the relative position of said collar with respect to said crank pin, a plurality of shims interposed between said collar and said crank disk, a cap for the end of said collar, and a screw-threaded stop engaging the other of said screw-threaded openings in said crank pin and limiting the movements of said adjuster.

4. The combination with a crank, of a crank pin tapering conically and extending from said crank, a collar having a tapering socket and disposed upon the outer portion of said crank pin, the said collar being threaded exteriorly and adjacent its outer end, a screw bolt threaded axially into the crank pin from its outer end, and having an outer head bearing against the outer end of the collar, a screw stop threaded axially into the crank pin from its opposite end to oppose and limit the movement of said bolt, and an oil cap threaded for engagement upon the outer threaded end of the collar and adapted to inclose the said head of said screw bolt.

In testimony whereof I have signed my name to this specification in the presence of two subscribing witnesses.

LAWRENCE R. WHITESIDE.

Witnesses:
HORATIO WHITING,
PHILIP D. ROLLHAUS.

---

Copies of this patent may be obtained for five cents each, by addressing the "Commissioner of Patents, Washington, D. C."